3,084,103
11-OXYGENATED 9α-HALOGENO-1,4-
PREGNADIENES
Arthur Nobile, Livingston, N.J., assignor to Schering
Corporation, Bloomfield, N.J., a corporation of New
Jersey
No Drawing. Filed Nov. 6, 1961, Ser. No. 150,160
23 Claims. (Cl. 167—74)

This invention relates to a new group of halogenated steroid dienes and to processes for their manufacture.

More particularly, this invention relates to 11-oxygenated-9α-halogeno-1,4-pregnadiene-21-ol-3,20-diones which may or may not have a 17α-hydroxyl group, and their 21-carboxylic acid esters.

The present application is a continuation-in-part of my copending applications Serial No. 449,257, filed August 11, 1954, and Serial No. 481,279, filed January 11, 1955, now United States Patent No. 2,837,464 and Serial No. 513,902, filed June 7, 1955.

The 17-desoxy-1,4-pregnadiene compounds of this invention prepared from the corresponding 17-desoxy-4-pregnene compounds (described, for example, in the patent to Fried, No. 2,852,511, dated September 16, 1958), possess adrenocortical properties and are useful in the treatment of Addison's disease and related diseases wherein such properties are indicated. The 17α-hydroxy compounds are generally useful for the same purposes as 9α-halogeno-cortisone and hydrocortisone, but because of their enhanced activity can be employed in smaller dosages. The 17-desoxy compounds can also be employed as intermediates for the preparation of the corresponding 17α-hydroxyl compounds.

The novel compounds of this invention are compositions of matter represented by 9α-halogeno-3,20-diketo-4-pregnenes having a hydroxy or ester group at the 21-position, H or hydroxyl at the 17α-position, keto or β-hydroxyl at the 11-position and characterized by the presence of a double bond in the 1-position.

A more specific representation of my novel composition is depicted by the following formula:

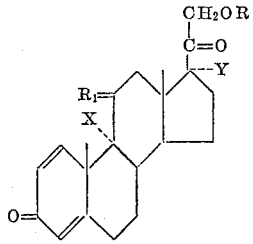

wherein X is a halogen having a lower atomic number than iodine, namely fluorine, chlorine and bromine; Y is H or OH; R is a member of the group consisting of hydrogen and lower alkanoyl, aroyl, and other non-toxic acyl groups, like acetyl, propionyl, butyryl, succinyl, cyclohexyl acetyl and propionyl, cyclopentyl acetyl and propionyl, dichloroacetyl, benzoyl, veratroyl, salicylyl, phthalyl, and the like; and $R_1$ is a member of the group consisting of keto and (H, βOH).

I have found that the introduction of an additional double bond into the A-ring of 9α-halogeno-3,20-diketo-4-pregnenes having a member of the group consisting of hydroxyl and acyloxy at the 21-position, a member of the group consisting of H and OH at the 17α-position and a member of the group consisting of keto and (H, β-OH) at the 11-position affords compounds which are more potent than the parent steroid. Thus, the compounds of the present invention which are devoid of a 17α-hydroxyl group (such absence being characteristic of mineralocortical substances), surprisingly exhibit glucocorticoid activities. In addition to being potent glucocorticoids, they are effective in controlling electrolyte balance as determined by liver glycogen assays and sodium retention methods, respectively. The 17α-hydroxy compounds of the present invention, on the other hand, exhibit strong anti-inflammatory activity. The novel products of this invention possess similar pharmacodynamic properties as do their corresponding 1,2-dehydro precursor starting materials but to a considerably enhanced degree. Thus, the increased potency of the compounds of the invention over the parent mono-unsaturated steroid will permit the use of smaller doses than now employed, so that untoward side effects will be reduced or even eliminated.

The compounds of the invention are prepared by subjecting the corresponding mono-unsaturated steroid, or its 21-ester, or its corresponding 3-hydroxy compound or 3-ester (in which case, the double bond will be between the $C_5$- and $C_6$-carbons) to the action of a dehydrogenating member of the family Corynebactriaceae. Especially satisfactory results have been obtained with species of the genus Corynebacterium, examples of which are *Corynebacterium simplex* (American Type Culture Collection No. 6946) and *Corynebacterium hoagii* (ATCC No. 7055). The starting pregnene compound may also be subjected to the action of the separated enzymes produced in a culture of the bacteria. Because the other genera of the family Corynebactriaceae, namely Listeria and Erysipelothrix, include pathogenic bacteria, the use of members of the genus Corynebacterium is preferred, as many members of such genus are non-pathogenic, including *C. simplex* and *C. hoagii*.

The cultures of the bacteria above referred to, or their enzymes, are capable of dehydrogenating the starting compound at $C_1$ and $C_2$, thereby introducing a double bond between such carbons. These cultures are capable, however, of effecting additional chemical transformations: thus, an ester group at the 3-position will be hydrolyzed, while a 3-hydroxyl group will be oxidized with simultaneous shifting of the 5,6-double bond to the 4,5-position; and an ester group at the 21-position will generally also be hydrolyzed. The temperature of incubation can range from about 25° C. or below to about 37° C., the lower temperatures favoring hydrolysis of ester groups.

The obtained free-21-ols may be esterified in the conventional manner, as by the action of an appropriate acid chloride or anhydride, preferably in the presence of pyridine. In general, the esters increase the duration of activity of the corresponding alcohols.

The compounds of this invention may be administered orally, parenterally, or topically, as required. Thus, the compounds may be formulated into tablets, ointments and the like, by mixing with a substantial quantity of a pharmaceutical carrier, such as gums, starches, sugars, and inert inorganic materials generally, in the case of tablets, and with inert creamy or unguent materials in the case of ointments; while for parenteral administration, the compounds are preferably prepared as aqueous or oil suspensions and administered generally intramuscularly.

In order to obtain a desirable growth of, for example, *Corynebacterium simplex* (ATCC No. 6946) for the process of this invention, a suitable nutrient medium is prepared containing carbohydrate, organic nitrogen, cofactors, and inorganic salts. It is possible to omit the use of carbohydrate without completely impairing the growth of the organism. The steroid compound, in the solid condition or dissolved or suspended in a water-miscible solvent which is non-toxic toward the organism, is added to the cultivated microorganism in a broth medium under sterile conditions. This culture is then shaken, aerated or simultaneously aerated and agitated, in order to enhance the growth of the microorganism and the biochemical conversion of the steroid substrate. The steriod may be added to the broth medium and then inoculated with the bacterium, or the cultivated microorganism in broth medium may be added to the steroid. In certain cases, depending on the condition of the reaction medium, it may be more desirable to obtain optimum growth of the microorganism before the addition of the steroid. Alternatively, enzyme preparations obtained in known manner from cultures of the microorganism may be used in my process.

In carrying out my process, the bacterium, such as *Corynebacterium simplex*, is cultivated in a suitable nutrient medium under aerobic conditions. After cultivation of the microorganism, the cell mass may be harvested by centrifuging the nutrient broth, decanting the supernatant liquid and suspending the cell mass in saline. A suitable volume of the cell suspension is then seeded into a desirable nutrient medium for supporting growth of the microorganism. The nutrient medium employed may be a yeast extract (Difco), casein hydrolysate (N-Z-Amine) (Type B, Sheffield), corn steep liquor, water extract or soybean oil meal, lactalbumin hydrolysate (Edamine Sheffield enzymatic), fish solubles, and the like.

Inorganic salts ared esirable to maintain a pH level in the reaction medium of between 6.8 and 7.2; but the use of such salts for buffering the reaction mixture may be omitted. The omission of inorganic salts causes the pH to rise from an initial value of 6.8 to about 7.7–8. This, however, will still permit the formation of the desired steroidal end products. The optimum temperature for growth of the selected microorganism is 37° C., but the temperatures may vary between 25° and 37°, and even between 20° and 40° C. The time of reaction may vary from as little as 3 hours to as much as 48 hours. The length of time which is employed will depend on the steroid which is being transformed. Any water-miscible, non-toxic (to the organism) solvent may be employed to dissolve or suspend the steroid prior to mixing with the culture. I prefer to use ethanol or acetone in such amounts that the final concentration of these solvents in the reaction mixture is no higher than about 7% and may amount to only traces; owing to evaporation, the final concentration of the organic solvent may even be practically zero.

Following the completion of the dehydrogenation process, which may be accompanied by hydrolysis when 3-esters are used, with oxidation of the 3-hydroxyl, the products of reaction may be recovered from the mixture by extraction with a suitable water-immiscible solvent, by filtration, by adsorption on a suitable adsorbent, or by any of the other procedures commonly used in the art. For extraction, chlorinated lower hydrocarbons, ketones, and alcohols are useful. These include chloroform, methylene chloride, trichloroethane, ethylene dichloride, butanol, diethylketone, and others. I prefer to use extraction as the method for isolating the steroidal products. Following extraction, the products may be isolated by concentration of the extracts to a small volume or to dryness. Purification of the residues may be then accomplished in several ways. In many instances, simple recrystallizations from a suitable solvent or solvent mixture, such as acetone, methylene chloride, ethanol, acetone-hexane, methylene chloride-hexane, etc. affords the desired dienone in excellent yield and high state of purity.

The following examples are illustrative of procedures for the preparation of the compounds of this invention, but are not intended to indicate the scope thereof, such scope being defined in the appended claims.

EXAMPLE 1

*1,4-Pregnadiene-9α-Fluoro-21-Ol-3,11,20-Trione*

To a 300 ml. Erlenmeyer flask are added 100 ml. of 0.1% yeast extract (Difco) containing 9.0 ml. of 0.2 M potassium dihydrogen phosphate and 9.0 ml. of 0.2 M disodium hydrogen phosphate. The flask and its contents are sterilized by autoclaving for 15 minutes at 120° C. and to the sterile medium is added 1 ml. of a 1% suspension of *Corynebacterium simplex* (ATCC No. 6946). The flask and its contents are incubated at 28° C. for 24 hours.

To a second 300 ml. Erlenmeyer flask are added 2 ml. of ethanol and 25 mg. of 9α-fluoro-11-dehydrocorticosterone. The 24-hour growth culture is transferred aseptically to the flask containing the steroid and the mixture is incubated at 28° C. and shaken for 10 hours. At the end of that time the reaction mixture is extracted thoroughly with chloroform and the chloroform extracts are concentrated to a residue. The residue is crystallized from acetone-hexane, affording 4 mg. of 9α-fluoro-1,4-pregnadiene-21-ol-3,11,20-trione.

The 21-acetate of the compound of this example is prepared by adding 0.3 g. of acetic anhydride to a solution of 1 g. of the 21-ol in 20 ml. of anhydrous pyridine. The reaction mixture is permitted to stand overnight and is then diluted with ice water. The resulting solid is recrystallized from methylene chloride-hexane, affording crystalline 9α-fluoro-1,4-pregnadiene-21-ol-3,11,20-trione 21-acetate.

EXAMPLE 2

*9α-Fluoro-1,4-Pregnadiene-11β,21-Diol-3,20-Dione*

By substituting the starting steroid in Example 1 by 9α-fluoro-4-pregnene-11β,21-diol-3,20-dione, gram for gram, there are obtained 5 mg. of the compound of this example after recrystallization from acetone-hexane.

The corresponding 21-acetate of the compounds of this example can be obtained by acetylation with acetic anhydride in pyridine, as in Example 1.

EXAMPLE 3

*9α-Chloro-1,4-Pregnadiene-11β,21-Diol-3,20-Dione*

To a 300 ml. Erlenmeyer flask are added 100 ml. of 0.1% yeast extract (Difco) containing 9.0 ml. of 0.2 M potassium dihydrogen phosphate and 9.0 ml. of 0.2 M disodium hydrogen phosphate. The flask and its contents are sterilized by autoclaving for 15 minutes at 120° C. and to the sterile medium is added 1 ml. of a 1% suspension of *Corynebacterium hoagii* (ATCC No. 7055). The flask and contents are incubated at 28° C. for 24 hours.

To a second 300 ml. Erlenmeyer flask are added 2 ml. of ethanol and 25 mg. of 9α-chlorocorticosterone. The 24-hour growth culture is transferred aseptically to the flask containing the steroid and the mixture is incubated at 28° C. and shaken for two hours. At the end of that time the reaction mixture is extracted thoroughly with chloroform and the chloroform extracts are evaporated to a residue. The residue is crystallized from acetone-hexane, affording 7 mg. of 9α-chloro-1,4-pregnadiene-11β,21-diol-3,20-dione.

From the reaction of propionic anhydride and the diene obtained, according to the esterification procedure of Example 1, there is obtained 9α-chloro-1,4-pregnadiene-11β,21-3,20-dione 21-propionate.

EXAMPLE 4

*9α-Bromo-1,4-Pregnadiene-11β,21-diol-3,20-dione*

By employing 9α-bromocorticosterone 21-acetate in the procedure described in Example 3, the bromo-diene is obtained as a crystalline solid after recrystallization from acetone-hexane.

EXAMPLE 5

*9α-Fluoro-1,4-Pregnadiene-11β,17α,21-Triol-3,20-Dione*

A one hundred ml. broth culture containing a 0.1% yeast extract concentration, 9.0 ml. of 0.2 M $KH_2PO_4$ and 9.0 ml. of 0.2 M $Na_2HPO_4$ is seeded with 1 ml. of a 24-hour broth culture of *Corynebacterium simplex*. The flask is incubated at 28° C. for 24 hours. A second 300 ml. of Erlenmeyer flask containing 150 mg. of sterile 9α-fluoro-4-pregnene-11β,17α,21-triol-3,20-dione in 5.0 ml. acetone is inoculated with the 24-hour culture of *Corynebacterium simplex*. The culture-containing steroid solution is incubated for 48 hours at 28° to 30° C.

The product is extracted with chloroform and isolated by evaporation to dryness. Recrystallization of the residue affords 9α-fluoro-Δ$^{1,4}$-pregnadiene-11β,17α,21-triol-3,20-dione as a crystalline solid.

EXAMPLE 6

*9α-Fluoro-1,4-Pregnadiene-17α,21-Diol-3,11,20-Trione*

A broth culture is seeded as described in Example 5 and the reaction is performed using 150 mg. of sterile 9α-fluoro-4-pregnene-17α,21-diol-3,11,20-trione in 5.0 ml. of acetone as reactant. Following the procedure of Example 5, the compound of this example is obtained as a crystalline solid.

EXAMPLE 7

*9α-Chloro-1,4-Pregnadiene-17α,21-Diol-3,11,20-Trione*

By employing 9α-chloro-4-pregnene-17α,21-diol-3,11,20-trione in the procedure described in Example 5, the 9α-chloro-pregnadiene of this example is obtained in crystalline form.

EXAMPLE 8

*9α-Bromo-1,4-Pregnadiene-17α,21-Diol-3,11,20-Trione*

By substituting the starting steroid in Example 1 by 9α-bromo-4-pregnene-17α,21-diol-3,11,20 - trione, gram for gram, there are obtained 5 mg. of the bromo-pregnadiene of this example which is purified by recrystallization from acetone-hexane.

EXAMPLE 9

*9α-Chloro-1,4-Pregnadiene-11β,17α,21-Triol-3,20-Dione*

By employing 9α-chloro-4-pregnene-11β,17α,21-triol-3,20-dione in the procedure described in Example 5, the chloro-diene is obtained as a crystalline solid after recrystallization from acetone-hexane.

EXAMPLE 10

*9α-Bromo-1,4-Pregnadiene-11β,17α,21-Triol-3,20-Dione*

Utilizing 9α - bromo-4-pregnene-11β,17α,21-triol-3,20-dione as the reacting steroid in the procedure of Example 5, the bromo-diene of this example is obtained as a crystalline solid after recrystallization from acetone-hexane.

As above indicated, the 17-desoxy compounds of the present invention can serve as intermediates for the preparation of the corresponding 17α-hydroxy compounds, i.e., the 9α-fluoro, chloro and bromo derivatives of Δ$^1$-cortisone and Δ$^1$-hydrocortisone. The introduction of the 17α-hydroxy group can be effected by subjecting the 17-desoxy compounds to the action of an hydroxylating organism chosen from the genus Trichothecium, such as *T. roseum* as described by Meystre et al., Helvetica Chim. Acta: 37, 1548 (1954). Thus, 9α-fluoro-1,4-pregnadiene-21-ol-3,11,20-trione, dissolved in a small quantity of acetone, can be 17α-hydroxylated in a culture of *Trichothecium roseum* in the manner described in the copending application of Hershel L. Herzog and Eugene P. Oliveto, Serial No. 484,588, filed January 27, 1955, now abandoned, to yield the 9α-fluoro derivative of Δ$^1$-cortisone. In similar fashion, 9α-fluoro-1,4-pregnadiene-11β,21-diol-3,20-dione can be converted into the corresponding 17α-hydroxy compound (the 9α-fluoro derivative of Δ$^1$-hydrocortisone).

I claim:

1. A composition of matter selected from the group consisting of 11-keto and 11β-hydroxy-9α-halogeno-Δ$^4$-pregnenes having a keto group at the 3- and 20-positions, a member of the group consisting of H and OH at the 17α-position, a member of the group consisting of hydroxyl and lower aliphatic acyloxy at the 21-position and characterized by the presence of a double bond in the 1-position.

2. A compound selected from pregnadienes having the formula:

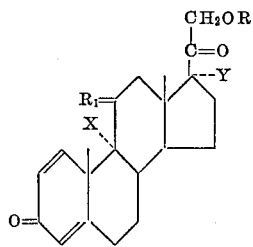

wherein X is a halogen atom having an atomic number lower than that of iodine, Y is a member of the group consisting of H and OH, R is a member of the group consisting of hydrogen and lower aliphatic acyl, and $R_1$ is a member of the group consisting of keto and (H, β-OH).

3. 9α-halogeno - 1,4 - pregnadiene-21-ol-3,11,20-trione, the halogen atom having an atomic number lower than that of iodine.

4. 9α-halogeno-1,4-pregnadiene-17α,21 - diol - 3,11,20-trione, the halogen atom having an atomic number lower than that of iodine.

5. 9α - halogeno-1,4-pregnadiene - 11β,21 - diol - 3,20-dione, the halogen atom having an atomic number lower than that of iodine.

6. 9α-halogeno-1,4-pregnadiene - 11β,17α,21-triol-3,20-dione, the halogen atom having an atomic number lower than that of iodine.

7. 9α-fluoro-1,4-pregnadiene-21-ol-3,11,20-trione.

8. 9α-fluoro-1,4-pregnadiene-17α,21-diol-3,11,20-trione.

9. 9α-fluoro - 1,4 - pregnadiene-21-ol-3,11,20-trione 21-acetate.

10. 9α-fluoro - 1,4 - pregnadiene - 17α,21 - diol-3,11,20-trione 21-acetate.

11. 9α-fluoro-1,4-pregnadiene-11β,21-diol-3,20-dione.

12. 9α-fluoro-1,4-pregnadiene-11β,17α,21 - triol - 3,20-dione.

13. 9α-fluoro-1,4-pregnadiene-11β,21-diol - 3,20 - dione 21-acetate.

14. 9α-fluoro-1,4-pregnadiene - 11β,17α,21 - diol - 3,20-dione 21-acetate.

15. 9α-chloro-1,4-pregnadiene-11β,21-diol-3,20-dione.

16. 9α-chloro-1,4-pregnadiene - 17α,21 - diol - 3,11,20-trione.

17. 9α-bromo-1,4-pregnadiene-11β,21-diol-3,20-dione.

18. 9α-bromo-1,4-pregnadiene - 17α,21 - diol - 3,11,20-trione.

19. A 3,11,20-triketo-9α-halo-17α,21-dihydroxy-Δ¹,⁴-pregnadiene of the formula

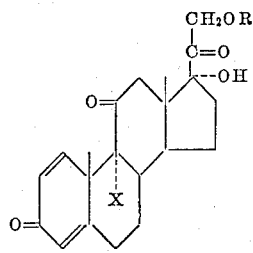

where X is a halogen atom having an atomic number lower than that of iodine and R is selected from the group consisting of H and lower hydrocarbon carbonyl.

20. A pharmaceutical preparation comprising 9α-fluoro-1-dehydrocortisone and a pharmaceutical carrier.

21. A pharmaceutical preparation comprising 9α-fluoro-1,4-pregnadiene-11β,17α,21-triol-3,20-dione 21-acetate and a pharmaceutical carrier.

22. A pharmaceutical preparation comprising a composition of matter selected from the group consisting of 11-keto and 11β-hydroxy-9α-halogeno-Δ⁴-pregnenes having a keto group at the 3-and 20-positions, a member of the group consisting of H and OH at the 17α-position, a member of the group consisting of hydroxyl and lower aliphatic acyloxy at the 21-position and characterized by the presence of a double bond in the 1-position, mixed with a non-toxic pharmaceutical carrier.

23. A pharmaceutical composition comprising a compound of the formula

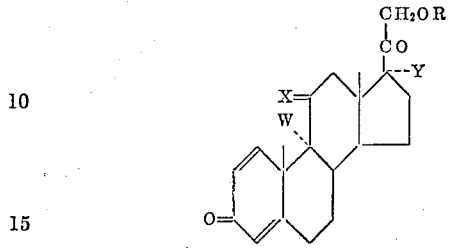

wherein R is a member of the group consisting of hydrogen and alkanoyl, while X is a member of the group consisting of O= and $$\diagdown \!\!\!\!\begin{array}{l} \text{OH} \\ \text{H} \end{array}$$

W is a member of the group consisting of fluorine, chlorine and bromine, and Y is a member of the group consisting of H and OH, mixed with a non-toxic pharmaceutical carrier.

No references cited.